United States Patent
Cao

(10) Patent No.: US 12,498,223 B2
(45) Date of Patent: Dec. 16, 2025

(54) OUTPUT CONSISTENCY CONTROL METHOD AND APPARATUS FOR MULTIPLE VIBRATORS, AND ELECTRONIC DEVICE

(71) Applicant: AAC Acoustic Technologies (Shanghai)Co., Ltd., Shanghai (CN)

(72) Inventor: Xueni Cao, Shenzhen (CN)

(73) Assignee: AAC Acoustic Technologies (Shanghai)Co., Ltd., Shanghai (CN)

( * ) Notice: Subject to any disclaimer, the term of this patent is extended or adjusted under 35 U.S.C. 154(b) by 410 days.

(21) Appl. No.: 18/090,528

(22) Filed: Dec. 29, 2022

(65) Prior Publication Data

US 2024/0077313 A1    Mar. 7, 2024

Related U.S. Application Data

(63) Continuation of application No. PCT/CN2022/119761, filed on Sep. 20, 2022.

(30) Foreign Application Priority Data

Sep. 7, 2022 (CN) .......................... 202211099488.9

(51) Int. Cl.
*G01C 19/5776* (2012.01)
(52) U.S. Cl.
CPC ................. *G01C 19/5776* (2013.01)
(58) Field of Classification Search
CPC ........................ G01C 19/5776; G06F 3/016
See application file for complete search history.

(56) References Cited

U.S. PATENT DOCUMENTS

2009/0015102 A1* 1/2009 Lim ...................... B41J 2/1621
                                                      310/357
2010/0082158 A1* 4/2010 Lakomiak .......... G05B 23/0221
                                                      702/56
(Continued)

FOREIGN PATENT DOCUMENTS

JP       2012055111 A    *  3/2012
JP       2012234489 A    * 11/2012

OTHER PUBLICATIONS

Machine translation of JP 2012055111 A (Year: 2012).*
Machine translation of JP 2012234489 A (Year: 2012).*

*Primary Examiner* — David J Bolduc
(74) *Attorney, Agent, or Firm* — Wiersch Law Group

(57) ABSTRACT

An embodiment of the present invention provides an output consistency control method for multiple vibrators, apparatus, electronic device. The method includes: acquiring a vibration parameter of each vibrator; determining a standard central point of the vibration parameters of the plurality of vibrators; abstracting the vibration parameter of each vibrator according to the standard central point to generate a plurality of abstracted parameters; and performing output control on the plurality of vibrators according to the plurality of abstracted parameters. In the technical solution provided by the embodiment of the present invention, by means of abstracting the vibration parameters of different vibrators to generate the abstracted parameters, and performing the output control on the plurality of vibrators according to the plurality of abstracted parameters, it is ensured that different vibrators have consistent effects in the same scenario.

6 Claims, 4 Drawing Sheets

(56) References Cited

U.S. PATENT DOCUMENTS

2013/0307786 A1\* 11/2013 Heubel .................... G08B 6/00
   345/173
2020/0026354 A1\* 1/2020 Swindells ............... G06F 3/016

\* cited by examiner

OUTPUT CONSISTENCY CONTROL METHOD AND APPARATUS FOR MULTIPLE VIBRATORS, AND ELECTRONIC DEVICE

CROSS-REFERENCE TO RELATED APPLICATIONS

The application is a continuation of International Application No. PCT/CN2022/119761 filed on Sep. 20, 2022, which is incorporated herein by reference in its entireties.

TECHNICAL FIELD

The present invention relates to the technical field of vibrations, in particular, to an output consistency control method and apparatus for multiple vibrators, and an electronic device.

BACKGROUND

Vibrators are elements that provide vibration functions. Different vibrators have different structures, resulting in different resonant frequencies. Therefore, different vibrators have different output intensities even under the same conditions. In order to ensure that different vibrators have consistent effects in the same scenario, it is necessary to control the output consistency of different vibrators.

SUMMARY

In view of this, embodiments of the present invention provide an output consistency control method and apparatus for multiple vibrators, and an electronic device to ensure that different vibrators have a consistent effect in the same scenario.

In one aspect, an embodiment of the present invention provides an output consistency control method for multiple vibrators, including: acquiring a vibration parameter of each vibrator; determining a standard central point of the vibration parameters of the plurality of vibrators; abstracting the vibration parameter of each vibrator according to the standard central point to generate a plurality of abstracted parameters; and performing output control on the plurality of vibrators according to the plurality of abstracted parameters.

Optionally, the determining a standard central point of the vibration parameters of the plurality of vibrators includes: determining an intermediate value of the acquired vibration parameters of the plurality of vibrators as the standard central point when the plurality of vibrators have a small property difference.

Optionally, the determining a standard central point of the vibration parameters of the plurality of vibrators includes: determining an intermediate value of the acquired vibration parameter of each vibrator as the standard central point when the plurality of vibrators have a large property difference.

Optionally, the abstracting the vibration parameter of each vibrator according to the standard central point to generate a plurality of abstracted parameters includes: abstracting the vibration parameter of each vibrator on the basis of a normalization processing manner according to the standard central point to generate a plurality of abstracted parameters.

Optionally, the performing output control on the plurality of vibrators according to the plurality of abstracted parameters includes: performing output control on the vibrator corresponding to each abstracted parameter according to each abstracted parameter.

Optionally, properties of each vibrator includes: a frequency, amplitude and vibration time of the vibrator.

Optionally, the vibration parameter includes a resonant frequency and an output intensity.

In another aspect, an embodiment of the present invention provides an output consistency control apparatus for multiple vibrators, including: a determining module, configured to acquire a vibration parameter of each vibrator and determine a standard central point of the vibration parameters of the plurality of vibrators; a generation module, configured to abstract the vibration parameter of each vibrator according to the standard central point to generate a plurality of abstracted parameters; and a control module, configured to perform output control on the plurality of vibrators according to the plurality of abstracted parameters.

In another aspect, an embodiment of the present invention provides a storage medium, wherein the storage medium includes a stored program, wherein the program, when run, controls a device with the storage medium to perform the output consistency control method for multiple vibrators according to any one of above.

In another aspect, an embodiment of the present invention provides an electronic device, including a memory and a processor, wherein the memory is configured to store information including program instructions; the processor is configured to control execution of the program instructions; and the program instructions, when loaded and executed by the processor, implement the steps of the output consistency control method for multiple vibrators according to any one of above.

In the technical solutions provided by the embodiments of the present invention, a vibration parameter of each vibrator is acquired; a standard central point of the vibration parameters of the plurality of vibrators is determined; the vibration parameter of each vibrator is abstracted according to the standard central point to generate a plurality of abstracted parameters; and output control is performed on the plurality of vibrators according to the plurality of abstracted parameters. In the technical solution provided by the embodiment of the present invention, by means of abstracting the vibration parameters of different vibrators to generate the abstracted parameters, and performing the output control on the plurality of vibrators according to the plurality of abstracted parameters, it is ensured that different vibrators have consistent effects in the same scenario.

DETAILED DESCRIPTION OF THE EMBODIMENTS

The technical solutions in the embodiments of the present invention will be clearly and completely described below in conjunction with the accompanying drawings in the embodiments of the present invention. Apparently, the described embodiments are only a part of the embodiments of the present invention, rather than all the embodiments. Based on the embodiments in the present invention, all other embodiments obtained by those ordinarily skilled in the art without doing creative work shall fall within the protection scope of the present invention.

The singular forms of "a", "said", and "the" used in the embodiments of the present invention and the claims are also intended to include plural forms, unless the context clearly indicates other meanings.

It should be understood that the term "and/or" herein is only an association relationship that describes associated objects, and represents that there can be three relationships. For example, A and/or B can represent that: A exists alone, A and B exist simultaneously, and B exists alone.

In addition, the character "/" herein generally indicates that the front and back associated objects are in an "or" relationship.

In order to ensure that different vibrators have a consistent effect in the same scenario, the vibrators are usually subjected to consistency treatment in two aspects, that is, numerical value consistency at a quantification level and trend consistency at a qualification level.

If there is no obvious difference in the properties of the vibrators, the consistency in the quantification level can be achieved. If there is a large difference in the properties of the vibrators, the consistency in the qualification level can be achieved.

For the effect consistency at the quantification level, it is only necessary to establish a mapping relationship between a resonant frequency and an output intensity of each vibrator for one-to-one corresponding, without special treatment.

Figure 1:
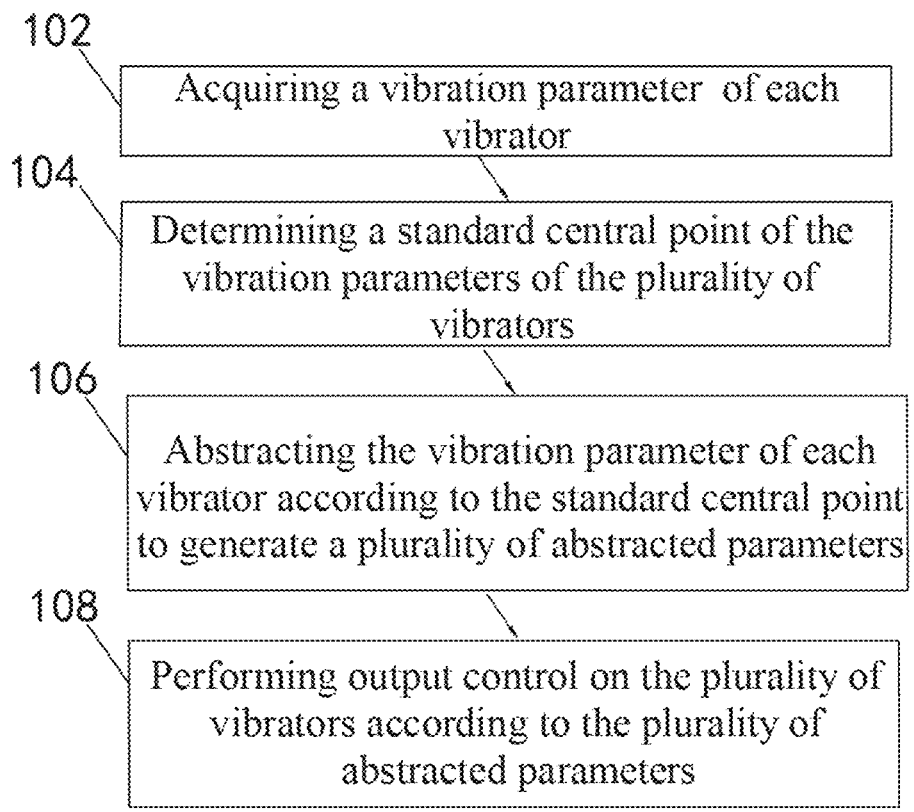
FIG. 1 is a flow chart of an output consistency control method for multiple vibrators provided by an embodiment of the present invention.

An embodiment of the present invention provides an output consistency control method for multiple vibrators. FIG. 1 is a flow chart of an output consistency control method for multiple vibrators provided by an embodiment of the present invention. As shown in FIG. 1, the method includes:

Step 102, acquiring a vibration parameter of each vibrator.

The vibration parameter includes a resonant frequency and an output intensity.

Step 104, determining a standard central point of the vibration parameters of the plurality of vibrators.

An intermediate value of the acquired vibration parameters of the plurality of vibrators is determined as a standard central point when the plurality of vibrators have a small property difference. Or, an intermediate value of the acquired vibration parameter of each vibrator is determined as a standard central point when the plurality of vibrators have a large property difference. For example, the standard central point is P (f0, i0). The abscissa of the standard central point P is a resonant frequency f0, and the ordinate is an output intensity i0.

The properties of each vibrator include a frequency, amplitude and vibration time of the vibrator.

If a difference ratio among the frequencies, amplitudes and vibration time of the plurality of vibrators is less than a set threshold, the property difference of the plurality of vibrators is small. If the difference ratio among the frequencies, amplitudes and vibration time of the plurality of vibrators is greater than or equal to the set threshold, the property difference of the plurality of vibrators is large. The set threshold can be set according to an actual situation. For example, the set threshold is 80%.

Figure 2:
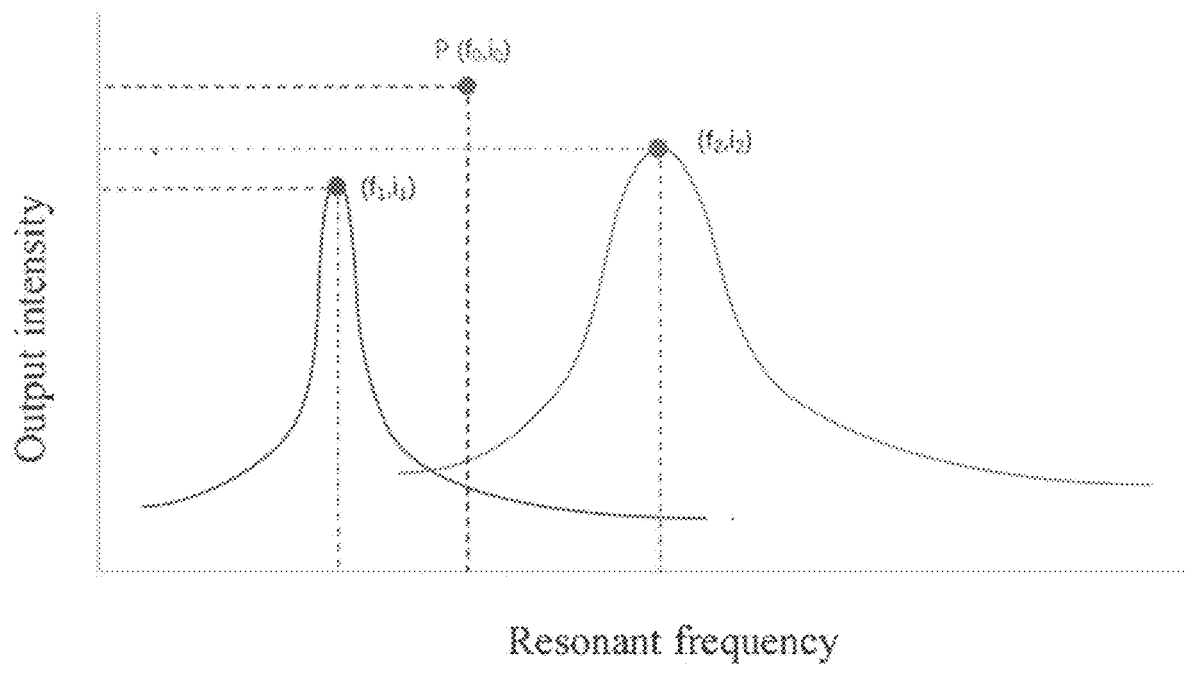
FIG. 2 is a schematic diagram of determining a standard central point of vibration parameters of a plurality of vibrators.

FIG. 2 is a schematic diagram of determining a standard central point of vibration parameters of a plurality of vibrators. As shown in FIG. 2, the abscissa is a resonant frequency, and the ordinate is an output intensity. In the vibration parameter of the first vibrator, the resonant frequency is f1, the output intensity is i1, and the vibration central point is (f1, i1). In the vibration parameter of the second vibrator, the resonant frequency is f2, the output intensity is i2, and the vibration central point is (f2, i2). Therefore, it is determined that an intermediate value of the vibration parameters corresponding to the vibration central point (f1, i1) of the first vibrator and the vibration central point (f2, i2) of the second vibrator is the standard central point P (f0, i0).

Step 106, abstracting the vibration parameter of each vibrator according to the standard central point to generate a plurality of abstracted parameters.

The vibration parameter of each vibrator is abstracted on the basis of a normalization processing manner according to the standard central point to generate a plurality of abstracted parameters.

In this step, the vibration central point of each vibrator is made to correspond to the standard central point (point P), and parameter abstraction is performed in the normalization manner (not limited to this manner), thus finally forming the unified abstracted parameters to ensure that the vibration trends of different vibrators are consistency.

Step 108, performing output control on the plurality of vibrators according to the plurality of abstracted parameters.

The output control is performed on the vibrator corresponding to each abstracted parameter according to each abstracted parameter.

In the technical solutions provided by the embodiments of the present invention, a vibration parameter of each vibrator is acquired; a standard central point of the vibration parameters of the plurality of vibrators is determined; the vibration parameter of each vibrator is abstracted according to the standard central point to generate a plurality of abstracted parameters; and output control is performed on the plurality of vibrators according to the plurality of abstracted parameters. In the technical solution provided by the embodiment of the present invention, by means of abstracting the vibration parameters of different vibrators to generate the abstracted parameters, and performing the output control on the plurality of vibrators according to the plurality of abstracted parameters, it is ensured that different vibrators have consistent effects in the same scenario.

In the technical solutions provided by the embodiments of the present invention, the consistency treatment performed on the output effects of different vibrators is conductive to managing the output effects of different vibrators. By means of unifying the vibration parameters of different vibrators to the same parameterization system (the abstracted parameters), the output effects of the plurality of vibrators can be edited in a unified manner, and it can be ensured that different vibrators have consistent effects, so that the design, development, application and promotion costs of vibration sense contents are greatly reduced.

Figure 3:
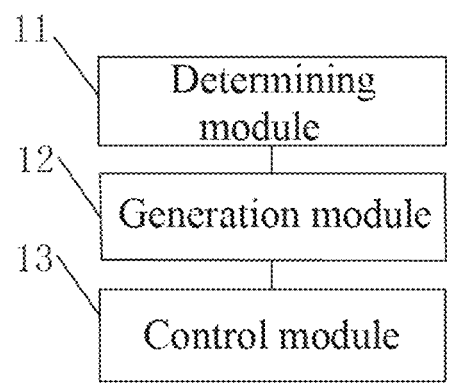
FIG. 3 is a schematic structural diagram of an output consistency control apparatus for multiple vibrators provided by an embodiment of the present invention.

An output consistency control apparatus for multiple vibrators is provided. FIG. 3 is a schematic structural diagram of an output consistency control apparatus for multiple vibrators provided by an embodiment of the present invention. As shown in FIG. 3, the apparatus includes a determining module 11, a generation module 12 and a control module 13.

The determining module 11 is configured to acquire a vibration parameter of each vibrator and determine a standard central point of the vibration parameters of the plurality of vibrators.

The generation module 12 is configured to abstract the vibration parameter of each vibrator according to the standard central point to generate a plurality of abstracted parameters.

The control module 13 is configured to perform output control on the plurality of vibrators according to the plurality of abstracted parameters.

The determining module 11 is specifically configured to determine an intermediate value of the acquired vibration parameters of the plurality of vibrators as the standard central point when the plurality of vibrators have a small property difference.

The determining module 11 is specifically configured to determine an intermediate value of the acquired vibration parameter of each vibrator as the standard central point when the plurality of vibrators have a large property difference.

The generation module 12 is specifically configured to abstract the vibration parameter of each vibrator on the basis of a normalization processing manner according to the standard central point to generate a plurality of abstracted parameters.

The control module 13 is specifically configured to perform the output control on the vibrator corresponding to each abstracted parameter according to each abstracted parameter.

The properties of each vibrator include a frequency, amplitude and vibration time of the vibrator.

The vibration parameter includes a resonant frequency and an output intensity.

A vibration parameter of each vibrator is acquired; a standard central point of the vibration parameters of the plurality of vibrators is determined; the vibration parameter of each vibrator is abstracted according to the standard central point to generate a plurality of abstracted parameters; and output control is performed on the plurality of vibrators according to the plurality of abstracted parameters. In the technical solution provided by the embodiment of the present invention, by means of abstracting the vibration parameters of different vibrators to generate the abstracted parameters, and performing the output control on the plurality of vibrators according to the plurality of abstracted parameters, it is ensured that different vibrators have consistent effects in the same scenario.

The output consistency control apparatus for multiple vibrators provided by this embodiment can be used for implementing the output consistency control method for multiple vibrators in FIG. 1 above. Specific descriptions may refer to the embodiment of the above output consistency control method for multiple vibrators. Repeated descriptions will not be made here.

An embodiment of the present invention provides a storage medium. The storage medium includes a stored program. The program, when run, controls a device with the storage medium to execute the various steps of the embodiment of the above output consistency control method for multiple vibrators. Specific descriptions may refer to the embodiment of the above output consistency control method for multiple vibrators.

An embodiment of the present invention provides an electronic device, including a memory and a processor. The memory is configured to store information including program instructions. The processor is configured to control execution of the program instructions. The program instructions, when loaded and executed by the processor, implements the various steps of the embodiment of the above output consistency control method for multiple vibrators. Specific descriptions may refer to the embodiment of the above output consistency control method for multiple vibrators.

Figure 4:
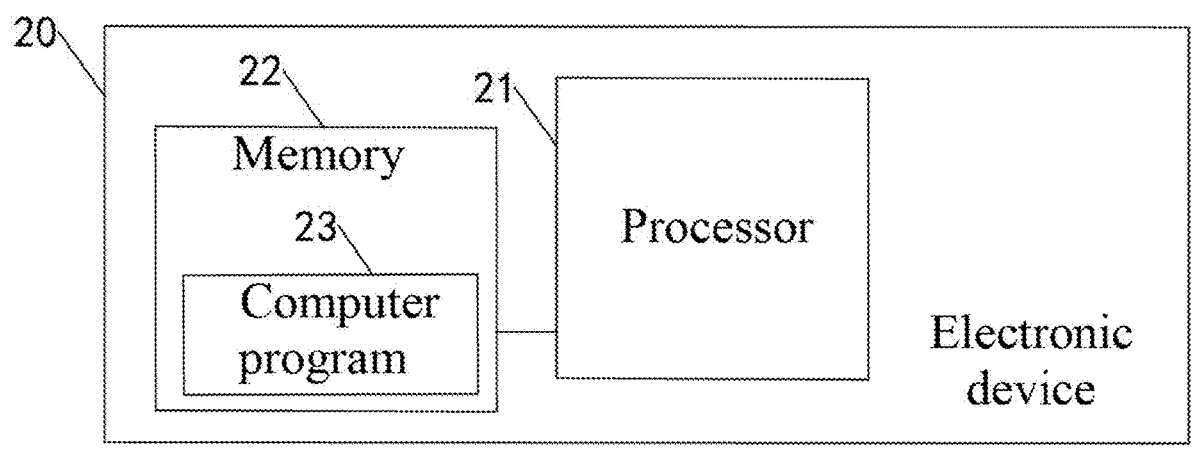
FIG. 4 is a schematic diagram of an electronic device provided by an embodiment of the present invention.

FIG. 4 is a schematic diagram of an electronic device provided by an embodiment of the present invention. As shown in FIG. 4, the electronic device 20 of this embodiment includes a processor 21, a memory 22, and computer programs 23 stored in the memory 22 and operable on the processor 21. The computer programs 23, when executed by the processor 21, implement the output consistency control method for multiple vibrators in the embodiment. In order to avoid repetition, the descriptions thereof will be omitted here. Or, the computer programs, when executed by the processor 21, realize the functions of various models/units in the output consistency control method for multiple vibrators in the embodiment. In order to avoid repetition, the descriptions thereof will be omitted here.

The electronic device 20 includes, but is not limited to, the processor 21 and the memory 22. Those skilled in the art can understand that FIG. 4 is only an example of the electronic device 20, does not constitute a limitation to the electronic device 20, and may include more or fewer components than those in the drawings, or combine some components or different components. For example, the electronic device may further include an input/output device, a network access device, a bus, and the like.

The processor 21 may be a central processing unit (CPU), or may be other digital signal processors (DSPs), application specific integrated circuits (ASICs), field-programmable gate arrays (FPGAs), or other programmable logic devices, discrete gates, transistor logic devices, discrete hardware components, etc. The general-purpose processor may be a microprocessor or the processor may also be any conventional processor or the like.

The memory 22 may be an internal storage unit of the electronic device 20, for example, a hard disk or an internal memory of the electronic device 20. The memory 22 may also be an external storage device of the electronic device 20, such as a plug-in hard disk equipped on the electronic device 20, a smart media card (SMC), a secure digital (SD) card, a flash card, and the like. Further, the memory 22 may also include both an internal storage unit of the electronic device 20 and an external storage device. The memory 22 is configured to store the computer programs and other programs and data required by the electronic device. The memory 22 may also be configured to temporarily store data that has been output or is to be output.

Those skilled in the art can clearly understand that, for the convenience and simplicity of description, the specific working process of the above described systems, apparatuses and units can refer to the corresponding processes in the above method embodiments, and will not be repeated here.

In the several embodiments provided by the present invention, it should be understood that the disclosed device, apparatus and method may be implemented in other manners. For example, the apparatus embodiments described above are only schematic. For example, the division of the units is only a logical function division, and there may be another division method during actually implementation. For example, multiple units or components can be combined or integrated into another system, or some features can be ignored or not performed. On the other hand, the mutual coupling or direct coupling or communication connection shown or discussed can be indirect coupling or communication connection through some interfaces, apparatuses or units, and can be electrical, mechanical or other forms.

The units described as separate components may or may not be physically separated, and the components displayed as units may or may not be physical units, that is, they may be located in one place, or they may be distributed on multiple network units. Part or all of the units may be selected according to actual needs to achieve the objectives of the solutions of the embodiments.

In addition, all functional units in all the embodiments of the present invention can be integrated into one processing unit, or each unit can physically exist alone, or two or more units can be integrated in one unit. The above integrated units can be implemented in the form of hardware, or can be implemented in the form of hardware plus software functional units.

The above-mentioned integrated units implemented in the form of software functional units may be stored in one computer-readable storage medium. The above-mentioned software functional units are stored in one storage medium and include several instructions to cause a computer apparatus (which may be a personal computer, a server, or a network device, etc.) or a processor to execute part of the steps of the methods of the various embodiments of the present invention. The aforementioned storage media include: a U disk, a mobile hard disk, a read-only memory (ROM), a random access memory (RAM), a magnetic disk or an optical disk, and other media that can store program codes.

The foregoing description is merely illustrative of the preferred embodiments of the present invention and is not intended to limit the present invention, but it is intended that any modifications, equivalents, substitutions, and modifications made within the spirit and principles of the present invention be embraced within the scope of the present invention.

What is claimed is:

1. An output consistency control method for multiple vibrators, comprising:

acquiring a vibration parameter of each of a plurality of vibrators;
    determining a standard central point of the vibration parameters of the plurality of vibrators:
    determining an intermediate value of the acquired vibration parameters of the plurality of vibrators as the standard central point when the plurality of vibrators have a property difference rate smaller than 80%;
    determining an intermediate value of the acquired vibration parameter of each of a plurality of vibrators as the standard central point when the plurality of vibrators have a property difference rate larger than or equal to 80%;
    abstracting the vibration parameter of each of a plurality of vibrators on the basis of a normalization processing manner according to the standard central point to generate a plurality of abstracted parameters; and
    performing output control on the vibrator corresponding to each abstracted parameter according to each abstracted parameter.

2. The method according to claim 1, wherein properties of each vibrator comprises: a frequency, amplitude and vibration time of the vibrator.

3. The method according to claim 1, wherein properties of each vibrator comprises: a frequency, amplitude and vibration time of the vibrator.

4. The method according to claim 1, wherein the vibration parameter comprises a resonant frequency and an output intensity.

5. A storage medium, wherein the storage medium comprises a stored program, wherein the program, when run, controls a device with the storage medium to perform the output consistency control method for multiple vibrators according to claim 1.

6. An electronic device, comprising a memory and a processor, wherein the memory is configured to store information including program instructions; the processor is configured to control execution of the program instructions; and the program instructions, when loaded and executed by the processor, implement the steps of the output consistency control method for multiple vibrators according to claim 1.

* * * * *